United States Patent
Krech et al.

Patent Number: 6,063,824
Date of Patent: *May 16, 2000

[54] MICROCELLULAR UREA-CONTAINING POLYURETHANE ELASTOMER

[75] Inventors: Ruediger Krech, Diepholz; Udo Rotermund, Ortrand; Heinz Bollmann, Alfhausen; Renate Hempel, Ruhland; Wolfgang Scholz, Lemfoerde; Manfred Genz, Damme, all of Germany

[73] Assignee: BASF Aktiengesellschaft, Ludwigshafen, Germany

[*] Notice: This patent is subject to a terminal disclaimer.

[21] Appl. No.: 09/091,697

[22] PCT Filed: Dec. 16, 1996

[86] PCT No.: PCT/EP96/05639

§ 371 Date: Nov. 18, 1998

§ 102(e) Date: Nov. 18, 1998

[87] PCT Pub. No.: WO97/23534

PCT Pub. Date: Jul. 3, 1997

[30] Foreign Application Priority Data

Dec. 23, 1995 [DE] Germany ............... 195 48 771

[51] Int. Cl.$^7$ ...................................... C08J 9/04
[52] U.S. Cl. ............... 521/121; 521/137; 521/155; 521/163; 521/170; 521/172; 521/174
[58] Field of Search .................. 521/121, 137, 521/155, 163, 170, 172, 174

[56] References Cited

U.S. PATENT DOCUMENTS

| | | |
|---|---|---|
| 3,590,112 | 6/1971 | Civardi . |
| 3,709,864 | 1/1973 | Loew et al. . |
| 3,823,111 | 7/1974 | Loew et al. . |
| 4,334,033 | 6/1982 | Metzinger et al. . |
| 4,421,870 | 12/1983 | Stutz et al. ............... 521/160 |
| 4,647,596 | 3/1987 | Ishii et al. . |
| 4,798,851 | 1/1989 | Werner et al. . |
| 5,173,518 | 12/1992 | Bott et al. . |
| 5,382,646 | 1/1995 | Narayan et al. . |
| 5,585,413 | 12/1996 | Nagashima . |
| 5,698,608 | 12/1997 | Nagashima . |

FOREIGN PATENT DOCUMENTS

| | | |
|---|---|---|
| 2003911 | 6/1990 | Canada . |
| 0373456 A3 | 6/1990 | European Pat. Off. . |
| WO97/10278 | 3/1997 | WIPO . |
| WO97/14734 | 4/1997 | WIPO . |

OTHER PUBLICATIONS

Journal of Elastomers & Plastics, vol. 21—Apr. 1980, E.C. Prolingheuer, J.J. Lindsey, & H. Kleimann.

Kautschuk & Gummi, Kunstoffe 35. Jahrgang, Nr. (Jul. 1982) Th. Timm.

*Primary Examiner*—John M. Cooney, Jr.
*Attorney, Agent, or Firm*—Fernando A. Borrego

[57] ABSTRACT

A microcellular PU elastomer having improved dynamic-mechanical properties and based on an isocyanate component consisting essentially of 4,4'-MDI and also further customary constituents has, after heating at from 100 to 120° C. for from 8 to 24 hours, a melting range of from 130° C. as the minimum lower limit to 230° C. as a minimum upper limit, measured by differential scanning calorimetry (DSC) at a heating rate of 20° C./min, and a urea content of from 14 to 18% by weight.

A process is also provided for preparing such a microcellular PU elastomer having improved dynamic mechanical properties. The microcellular PU elastomers can be used for producing damping elements.

21 Claims, No Drawings

MICROCELLULAR UREA-CONTAINING POLYURETHANE ELASTOMER

FIELD OF THE INVENTION

The present invention relates to a microcellular polyurethane elastomer containing urea groups which is based essentially on diphenylmethane 4,4'-diisocyanate (4,4'-MDI) as isocyanate component and has improved static and dynamic properties. The invention also relates to a process for preparing such a microcellular polyurethane elastomer and to its use for producing damping elements.

PRIOR ART

The preparation of cellular polyurethane elastomers, their use and their mechanical and chemical performance parameters are comprehensively described in Kunststoffhandbuch, Volume VII, Polyurethanes, 1966, 1983 and 1993 by R. Vieweg and A. Höchtlen or G. Oertel (Carl Hanser Verlag, Munich). Essentially, in comparison with rubber types used in a similar way, microcellular polyurethane elastomers have significantly improved damping properties with excellent volume compressibility, as a result of which they are favored as constituents of vibration- and shock-damping systems, particularly in the automobile sector.

The most typical example of a microcellular polurethane elastomer for the above application is probably the reaction product of naphthylene 1,5-diisocyanate (NDI) and polyethylene glycol adipate having a mean molecular weight of about 2000 g/mol, which is reacted as NCO prepolymer with an activator-containing 50% strength aqueous solution of a fatty acid sulfonate. Although the performance level of this basic formulation has not hitherto been equalled in respect of its damping characteristics and other static and dynamic performance parameters, the literature does disclose a few efforts made to replace the NDI responsible for the excellent elastomeric properties by the far cheaper and significantly easier-to-handle 4,4'-MDI as isocyanate component, with distinct property losses being reckoned with. Characteristic differences in performance values between NDI-based and 4,4'-MDI-based compact polyurethane elastomers in general and micro-cellular formulations in particular are given by E. C. Prolingheuer, J. J. Lindsay and H. Kleimann in Journal of Elastomers and Plastics, Vol. 21, April 1980. Important disadvantages of a microcellular polyurethane elastomer based on 4,4'-MDI are here given as a significantly higher degree of damping with greater material heating and significantly increased consolidation values under dynamic loading, which lead to more rapid material wear compared with NDI.

Despite these obvious disadvantages, it is known from the literature, as already mentioned above, that attempts have been made to use 4,4'-MDI in place of NDI as isocyanate component in microcellular polyurethane elastomers. However, these experiments have been restricted to the use of new raw material components, in particular relatively high molecular weight polyhydroxyl compounds, by means of which certain property advantages of the resulting microcellular polyurethane elastomer are to be achieved.

Thus, EP-A-0496204 describes a process for preparing cellular polyurethane elastomers using polyether carbonate diols containing polyoxytetramethylene glycol units having a number-average molecular weight Mn of from 150 to 500 g/mol as oligomeric polyhydroxyl compound. This is supposed to improve the mechanical properties, in particular the extension at break, even at relatively low temperatures. An improvement according to the invention in the static compressive sets in accordance with DIN 53 572, 70° C., which are known to correlate with the dynamic consolidation values, cannot be found. Even when using NDI and an aqueous foaming component as described in the original preparation instructions (cf. Kunststoffhandbuch, Volume VII, Polyurethane, 1966, 1983 and 1993), only average static compressive sets are obtained.

EP-A-0243832, which likewise claims the use of 4,4'-MDI, inter alia in combination with water as blowing agent, for preparing microcellular polyurethane elastomers, encompasses as significant inventive concepts the use of a hydroxyl-containing polycondensate of a short-chain polyoxytetramethylene glycol and an aliphatic dicarboxylic acid as oligomeric polyhydroxyl compound with the objective of obtaining a polyol containing ester groups and capable of being readily metered by pumping for cellular or compact polyurethane elastomers having improved mechanical and hydrolytic properties. However, there is no indication of degrees of permanent set on static or dynamic loading, by means of which vibration-resistant materials are customarily characterized. There is therefore no apparent relationship between inventive content and the permanent deformation on static and dynamic loading relevant to shock-damping materials.

On the other hand, DE-A-3613961 describes a microcellular polyurethane elastomer based on 4,4'-MDI which, owing to a defined composition of the oligomeric polyhydroxyl compound, namely a copolymer of polytetrahydrofuran and $\epsilon$-caprolactone, has mechanical properties which represent a favorable compromise between static strength and dynamic stressability. Despite the use of expensive polyol starting materials, the performance gain achieved thereby is only small in terms of the test values "product life", flexural strength by the de Mattia method and permanent set at 50% compression. For example, the measured values for the compressive set, which are directly related to the dynamic consolidation value which is relevant in practice, show insufficient improvement for practical use when the invention is employed. The test criteria "product life" and flexural strength by the de Mattia method which are used are also not sufficiently suitable for a realistic evaluation of the dynamic properties, since they are unable, specifically in the case of partial property improvements, to sufficiently differentiate the actual performance differences between polyurethane elastomers based on MDI and NDI.

In addition to the improvement described in the above-mentioned DE-A-3613961 by appropriate selection of the oligomeric polyhydroxyl compound, the isocyanate component has a decisive influence, as can readily be seen from the example of NDI which has already been discussed and leads to polyurethane products having excellent static dynamic elastomeric properties. Thus, the use of the isocyanates 3,3'-dimethylbiphenyl 4,4'-diisocyanate (TODI) and paraphenylene diisocyanate (PPDI) likewise results in microcellular and compact polyurethane elastomers having excellent static and long-term elastic properties. The reason for this is said to be the very good crystallizability of the rigid segment formed from urea or urethane groups, which leads to good separation of this segment from the flexible segment formed from oligomeric polyhydroxyl compounds. On the other hand, the poorer crystallization tendency of the urea or urethane groups based on 4,4'-MDI resulting from their more angled 3-dimensional structure is regarded as the essential reason for the significantly worsened static and long-term elastic properties.

In DE-A-195 09 819, an OH prepolymer is used in addition to the NCO prepolymer. According to our studies, this variant does give good demoldability, ie. no destruction of the parts on removal from the mold, and in addition good technical processability, but the compressive set and tear propagation resistance are completely unsatisfactory.

SUMMARY OF THE INVENTION

It is an object of the present invention to develop as the main isocyanate component a microcellular polyurethane elastomer on the basis of 4,4'-MDI which is far cheaper and significantly easier-to-handle than NDI, TODI and PPDI, which polyurethane elastomer has, regardless of the type of oligomeric polyhydroxyl compound used, clearly improved static mechanical properties, in particular compressive sets, and dynamic consolidation values and is thus particularly suitable for shock-damping systems in motor vehicle construction.

We have found that this object is achieved by using 4,4'-MDI as the main isocyanate component to prepare a microcellular polyurethane elastomer containing urea groups, hereinafter referred to as microcellular PU elastomer, having a urea content of from 14 to 18% by weight and a structure which, after heating at from 100 to 120° C. for from 8 to 24 hours, is characterized by a melting range from 130° C. as the minimum lower limit to 230° C. as the minimum upper limit, measured by the differential scanning calorimetry (DSC) method at a heating rate of 20° C./min, which melting range can be set by adding Brönstedt or Lewis acid reagents in an amount of from 0.01 to 5% by weight, based on the weight of the components a), b), e) and, if used, c).

The present invention accordingly relates to a microcellular PU elastomer based on a) an isocyanate component consisting essentially of diphenylmethane 4,4'-diisocyanate together with b) at least one oligomeric polyhydroxyl compound having a number average molar mass of from 1000 to 5000 g/mol and a functionality of from 1.7 to 3, preferably 2, c) if desired, low molecular weight chain extenders and/or crosslinkers and d) blowing agents
and also e) catalysts and, if desired, f) auxiliaries and/or additives, which has a urea content of from 14 to 18% by weight, defined as the amount in percent of urea of the empirical formula $C_{14}H_{12}ON_2$ formed from diphenylmethane diisocyanate, based on the total amount of the elastomer after urea formation, and has, after heating at from 100 to 120° C. for from 8 to 24 hours, a melting range of from 130° C. as the minimum lower limit to 230° C. as the minimum upper limit, measured by differential scanning calorimetry (DSC) at a heating rate of 20° C./min, which melting range can be set by adding Brönstedt or Lewis acid reagents in an amount of from 0.01 to 5% by weight, based on the weight of the components a), b), e) and, if used, c).

The present invention also relates to a process for preparing such a microcellular PU elastomer having improved dynamic mechanical properties, wherein Brönstedt acid or Lewis acid reagents are added in an amount of from 0.01 to 5% by weight, based on the weight of the components a), b), e) and, if used, c), and the microcellular polyurethane elastomer containing urea groups is heated at from 100 to 120° C. for from 8 to 24 hours, and the use of the microcellular PU elastomers for producing damping elements.

Surprisingly, studies of many variants having different chemical and physical structures of the microcellular PU elastomer based on 4,4'-MDI have shown us that a structure which, after heating at from 100 to 120° C. for from 8 to 24 hours, is characterized by a melting range from 130° C. as the minimum lower limit to 230° C. as the minimum upper limit, measured by DSC at a heating rate of 20° C./min gives a minimum compressive set at 80° C. This compressive set, measured after 60% compression for 22 hours at 80° C., correlates with the consolidation after long-term dynamic loading, which is important in terms of demands made in practice, in that a lower compressive set also corresponds to a desired lower consolidation value. The elastomers based on 4,4'-MDI and having different chemical structures can be prepared in a known manner, in particular by use of oligomeric polyhydroxyl compounds comprising various basic building blocks, e.g. containing polyester and/or polyether groups. The structures of the present invention which can be built up using such chemical building blocks can be produced by use of various means, e.g. an appropriate reaction procedure involving measures which retard the isocyanate addition reaction, by an appropriate thermal post-treatment or the introduction of materials promoting the formation of these structures by acting as nucleating agents for the structures of the present invention. These measures for producing the structures of the present invention can also be employed in combination for reinforcing the action.

In addition to being characterized by DSC, the novel structures can preferably additionally be described by gel permeation chromatography (GPC) in a solvent mixture comprising N,N-dimethylformamide with 1% of di-n-butylamine after dissolution of the microcellular PU elastomer in this mixture at 90° C. by signals at apparent molar masses above 250,000 g/mol. The typical feature of these signals is that they disappear or become smaller after the addition of lithium chloride. The GPC itself is carried out using this solution, both with and without LiCl, on a column set containing Ultrastyragel of suitable pore sizes and is calibrated against PMMA samples as standard. The detection can be effected both by measurement of the refractive index and by UV absorption.

The term "apparent molar mass" means that these typical high molecular weight structures of greater than 250,000 g/mol result completely or partially not from chemical but predominantly from physical compounds, since they disappear or become smaller in the presence of 0.1 mol of LiCl per liter of solution.

It is generally recognized that structures can be described and characterized using DSC and GPC. It is also known that, quite generally, different structures can be produced from polymers having the same chemical composition per se: these structures are important in determining the properties which are influenced not only by the chemical composition alone. A new structure of this type is to be regarded as a new material modification, as is indicated in known textbooks on the description and characterization of polymers, e.g. the book "Polymeranalytik" by Martin Hoffmann, Herbert Krömer and Rainer Kuhn, published by Georg Thieme Verlag Stuttgart 1977.

When the material modification of the present invention, which can be characterized by means of DSC and possibly also GPC under prescribed conditions, is produced in the microcellular PU elastomers, these elastomers unexpectedly have a low compressive set at 80° C. and a low dynamic consolidation value.

It is known that there are also quite generally relationships between such structures and properties of polyurethane elastomers and that the DSC describes, for example, the degree of molecular order as a structural parameter. Such relationships are described for PU elastomers by, for example, Th. Timm in the journal Kautschuk und Gummi Kunststoffe, Year 35, No. 7/82. However, it can in no way be deduced from the general knowledge of relationships between structure and properties that the structures claimed in the present invention give the desired good properties of the cellular PU elastomers based on 4,4'-MDI. It can be easily shown experimentally that cellular PU elastomers having the same chemical composition but not the structures of the present invention give only undesirably high compressive sets and dynamic consolidation values. However, the chemical composition cannot be selected completely freely, but it should adhere as optimum to a urea content of from 14 to 18% by weight in the microcellular PU elastomers. Within this urea concentration range, the compressive sets and dynamic consolidation values are lowered only when the structures of the present invention have been produced.

The structures of the present invention cannot be produced using elastomer building blocks comprising NCO and OH prepolymers described, for example, in DE-A-195 09 819. These consistently give only unsatisfactorily high compressive sets and low tear propagation resistances.

The preparation of cellular PU elastomers based on 4,4'-MDI and having such structures which are favorable for the properties is not previously known.

Kunststoffhandbuch, Volume VII, Polyurethane 1993 describes as significant means for improving the compressive set in flexible foam systems and compact polyurethane elastomers the creation of additional chemical crosslinking points, for example by means of a limited increase in functionality in the polyurethane-forming raw materials or by means of sulfur, peroxide and isocyanate vulcanization. However, in the case of the microcellular PU elastomers, these measures worsen, ie. increase, the compressive set and the dynamic consolidation behavior.

The conventional higher chemical crosslinking for improving the compressive set thus fails in the case described in the present invention, and it is completely unexpected that the structures of the present invention lower the compressive set and the dynamic consolidation without higher chemical crosslinking.

As a result of extensive studies it has been found that the desired structures of the present invention can be produced using reaction-retarding substances which are added to the reaction mixture in limited amounts.

The addition of these reaction-retarding substances to the reaction mixture can be carried out at the beginning of or during the preparation of the prepolymer and/or at the beginning of the foaming process.

Substances which have this action are known Lewis acid or Brönstedt acid reagents which are used in polyurethane chemistry primarily for setting reaction times required for technical process reasons or for obtaining storage-stable isocyanate-containing polyurethane preparations. These include, for example, benzoyl chloride, diethylene glycol bis(chloroformate), p-toluenesulfonic acid, n-alkylbenzenesulfonic acid and ethanolamine salts thereof, acetylacetone, ethyl acetoacetate and mineral acids such as phosphoric and hydrochloric acid.

Type and amount used depend on the particular application.

The production of the structures of the present invention, which may be characterized by DSC and possibly GPC in the manner mentioned, is the main criterion here. It has surprisingly been found that these structures can be particularly easily produced by means of latent or delayed-action catalyst systems. These catalysts become active only after a certain time after mixing the reacting components, by first retarding the polyurethane and urea formation reactions. Such catalyst systems can, for example, be mixtures of reaction retardants and reaction accelerators or materials bearing chemical groups for accelerating and retarding the reaction in one molecule. The monoethanolamine salt of n-alkylbenzenesulfonic acid with $C_9$ to $C_{15}$ is a useful example of such a catalyst.

These reaction-retarding substances are used in an amount of from 0.01 to 5% by weight, preferably from 0.05 to 2% by weight, based on the weight of the components a), b), e) and, if used, c). In this way, the structures described can be produced in microcellular PU elastomers just by simple foaming in closed molds of bench batches or of mixtures of the reacting components preferably prepared in lower pressure foaming machines.

The production of the structures of the present invention is considerably aided if the heating of the microcellular PU elastomer commences immediately or at the latest 2 hours after demolding. The characterization of the structures of the present invention also allows their relative quantification. Thus, for example, when the use of reaction-retarding materials or molecular groups is combined with immediate thermal post-treatment directly after demolding, the ratio of the area or the height of said peaks above 250,000 g/mol in the GPC to the main peak of the PU elastomer in the range below 250,000 g/mol increases. This higher ratio indicates a higher content of the structures of the present invention, which does not occur, or occurs only insufficiently, if the heating is commenced only after 2 hours after demolding, owing to the higher amount of structures of the present invention in the microcellular PU elastomer, the compressive set and the dynamic consolidation decrease.

It is an advantage that this measure does not adversely affect the demoldability or the prescribed cycle times.

It has surprisingly been found that a proportion of dispersed urea in the components a), d) and, if used, e) and f), for example as reaction product of 4,4'-MDI with water, promotes the formation of the structures of the present invention. The urea content should here be from 0.05 to 5% by weight, preferably from 0.1 to 1% by weight, based on the total elastomer. This dispersed urea is preferably produced by addition of the appropriate amount of isocyanate to the aqueous crosslinker component.

The percentage of urea is defined as the amount in percent of urea of the empirical formula $C_{14}H_{12}ON_2$ formed from MDI, based on the total amount after urea formation. The stoichiometric amount of $CO_2$ which is evolved in the formation of the urea from water and isocyanate is then no longer included in the total amount, as is shown, for example, in the calculation formula for the total amount of urea in the microcellular PU elastomer in our Example 1 for illustrating the invention.

The urea which promotes the formation of the structures of the present invention can also be generated in another way, e.g. from MDI and an amine such as 4,4'-diphenylmethanediamine.

Apart from the parameter compressive set as static measure for the rebound behavior of an elastomer and as a correlation parameter for the consolidation value which is determined under dynamic conditions and better characterizes the practical demands made of a shock-damping system in the motor vehicle sector, further properties such as tensile strength, elongation at break and tear propagation resistance serve to comprehensively characterize an elastomer. The knowledge of these properties determined under static conditions is particularly important for assessing the demolding strength and the mechanical stability under dynamic stresses, with the tear propagation resistance having special significance. It is known that the value of the tear propagation resistance in compact polyurethanes is primarily determined by the respective rigid segment content set by the formulation, ie. ultimately by its formulation hardness. In the case of cellular polyurethanes, the bulk density of the foam is an additional important influencing parameter and must be taken into account when comparing foams of different bulk density.

Microcellular PU elastomers in which polymer structure and cell formation essentially occur by means of the main reaction between isocyanate and water have a rigid segment based on urea structures. Increasing the content of rigid urea segments, which can be achieved by increasing the isocyanate content of the formulation or by increasing the molecular weight of the oligomeric polyhydroxyl compound while keeping the isocyanate content unchanged, leads to improved tear propagation resistances and tensile moduli, analogously to the compact elastomers. However, this modification method has only restricted utility, since, on the one hand, the material-specific parameter compressive strength is undesirably increased at a particular bulk density and, on the other hand, the carbon dioxide evolution which accompanies urea formation and is utilized for the blowing process is significantly increased, so that even when the compressive strength is still acceptable there are expansion effects in the demolded body with mechanical damage resulting from crack formation.

It has surprisingly been found that the structures of the present invention are particularly effective for lowering compressive set and dynamic consolidation, together with good demolding behavior, only in combination with a urea content of from 14 to 18% by weight. Good demolding behavior requires a comparatively high strength at the instant of demolding, so that, particularly in the case of demolding parts having a complicated construction, no mechanical damage occurs to the microcellular PU elastomer molding.

The urea content of from 14 to 18% by weight can be set with the aid of the amount of water in the formulation corresponding to the formula given in Example 1 for illustrating the invention. Any urea which may be added or generated prior to prefoaming for promoting the formation of the structures of the present invention is included in the total amount of urea. However, this amount is usually negligible compared with the total urea content.

In the urea concentration range below 14% by weight, the structures of the present invention can no longer be reliably produced using the above described measures and/or their action in lowering compressive set and dynamic consolidation is restricted. In the concentration range above 18% by weight, the generation of these structures is likewise no longer reliably possible. In addition, the expansion effect of the simultaneous $CO_2$ evolution resulting from the reaction of water and isocyanate for producing the urea is so great that undesired cracks can form in the moldings after demolding.

For preparing the microcellular PU elastomers of the present invention, use is made of, apart from the materials already mentioned, the starting components known per se, about which the following may be said:

a) According to the present invention, the isocyanate component a) essentially comprises 4,4'-MDI.

However, it can additionally contain further organic and/or modified organic polyisocyanates. In addition to the 4,4'-MDI, preference is given to using 2,4'- and/or 2,2'-MDI as well as mixtures of MDI isomers with polyphenylpolymethylene polyisocyanates (raw MDI) and mixtures of raw MDI and tolylene diisocyanate.

It is also possible to use modified polyfunctional diphenylmethane di- or polyisocyanates, ie. products which are formed by chemical reaction of the MDI. Examples which may be mentioned are di- and/or polyisocyanates based on the diphenylmethane structure and containing ester, urea, biuret, allophanate and preferably carbodiimide, isocyanurate and/or urethane groups.

Specific examples based on the diphenylmethane structure are: aromatic polyisocyanates containing urethane groups and having NCO contents of from 3 to 33.6% by weight, preferably from 4 to 8% by weight, 4,4'-MDI modified, for example, with low molecular weight diols, triols, oxyalkylene glycols, dioxyalkylene glycols or polyoxyalkylene glycols having molecular weights of up to 800, with examples of di- or polyoxyalkylene glycols which can be used individually or as mixtures being: diethylene, dipropylene, polyoxyethylene, polyoxypropylene and polyoxypropylene-polyoxyethylene glycols. Also suitable are NCO-containing prepolymers having NCO contents of from 3 to 31% by weight, preferably from 4 to 8% by weight, with polyester alcohols, for example based on dicarboxylic acids having from 2 to 12 carbon atoms and dihydric alcohols. Polyester alcohols which can be used are those described in more detail under the polyhydroxyl compounds. Similarly, it is also possible to use ester-modified polyethers or ether-modified polyesters.

Also useful are liquid polyisocyanates containing carbodiimide groups and/or isocyanurate rings and having NCO contents of from 3 to 33.6% by weight, for example those based on 4,4'-, 2,4'- and/or 2,2'-MDI and the corresponding isomer mixtures, e.g. from 4,4'- and 2,4'-MDI, raw MDI and mixtures of tolylene diisocyanates and raw MDI.

The use of prepolymers of polyisocyanates and representatives of the components (b) and, if desired, (c) having isocyanate end groups in place of the isocyanates or together with these as a mixture is likewise possible.

The diisocyanates mentioned can, if desired, be used together with about 15 mol % (based on diisocyanate) of a higher-functional polyisocyanate. However, the amount of the higher-functional polyisocyanate has to be limited in such a way that a product which is still at least partially soluble in N,N-dimethylformamide containing 1% of di-n-butylamine is obtained. A larger amount of higher-functional isocyanates generally has to be compensated for by the concomitant use of compounds having an average functionality in the reaction with isocyanates of less than two and/or isocyanates having an average functionality of less than two, so that excessive chemical crosslinking of the product is avoided.

b) Suitable oligomeric polyhydroxyl compounds b) are particularly those having an essentially linear molecular chain. Preference is given to using polyoxyalkylene glycols, essentially polyoxytetramethylene glycols, polyoxyalkylene glycols modified with carbonate and ester groups, essentially polyoxytetramethylene glycols and polyester glycols modified with carbonate and ester groups and having a number-average molar mass of from 1000 to 5000 g/mol.

Both the polyoxytetramethylene glycols and modified polyoxytetramethylene glycols containing carbonate and ester groups can be employed as individual components or in the form of mixtures. Likewise, the polyester polyols can be employed individually or in admixture with one another.

Suitable essentially linear polyester polyols can be prepared, for example, from dicarboxylic acids having from 2 to 12 carbon atoms and dihydric alcohols. Examples of suitable dicarboxylic acids are: aliphatic dicarboxylic acids such as succinic acid, glutaric acid, adipic acid, suberic acid, azelaic acid and sebacic acid and aromatic dicarboxylic acids such as phthalic acid, isophthalic acid and terephthalic acid. The dicarboxylic acids can be used individually or as mixtures. To prepare the polyester polyols, it may be advantageous to use, in place of the carboxylic acid, the corresponding carboxylic acid derivatives such as carboxylic esters having from 1 to 4 carbon atoms in the alcohol radical, carboxylic anhydrides or carboxylic acid chlorides. Examples of dihydric alcohols are glycols having from 2 to 16 carbon atoms, preferably from 2 to 6 carbon atoms, for example ethylene glycol, diethylene glycol, 1,4-butanediol, 1,5-pentanediol, 1,6-hexanediol, 1,10-decanediol, 2,2-dimethylpropane-1,3-diol, 1,3-propanediol and dipropylene glycol. Depending on the properties desired, the dihydric alcohols can be used individually or in admixture with one another.

Also suitable are hydroxyl-containing polyesters of carbonic acid with the glycols mentioned, in particular those having from 4 to 6 carbon atoms, such as 1,4-butanediol and/or 1,6-hexanediol, condensation products of hydroxycarboxylic acids, for example ω-hydroxycaproic acid and preferably polymerization products of lactones, for example unsubstituted or substituted ε-caprolactones.

As polyester polyols, preference is given to using ethanediol polyadipate, 1,4-butanediol polyadipate, ethanediol butanediol polyadipate, 1,6-hexanediol-neopentyl glycol polyadipate, 1,6-hexanediol-1,4-butanediol polyadipate and polycaprolactones.

Suitable polyoxyalkylene glycols, essentially polyoxytetramethylene glycols, containing ester groups are polycondensates of organic, preferably aliphatic, dicarboxylic acids, in particular adipic acid, with polyoxymethylene glycols having a number-average molecular weight of from 162 to 600 and aliphatic or non-aliphatic diols, in particular 1,4-butanediol. Other suitable polyoxytetramethylene glycols containing ester groups are the polycondensates formed with ε-caprolactone.

Suitable polyoxyalkylene glycols, essentially polyoxytetramethylene glycols, containing carbonate groups are polycondensates of these with alkyl or aryl carbonates or phosgene.

c) In the preparation according to the present invention of the microcellular PU elastomer, it is possible to use low molecular weight chain extenders and/or crosslinkers c).

Suitable chain extenders and/or crosslinkers usually have molecular weights of less than 500, preferably from 60 to 400. Examples of chain extenders/crosslinkers which can be used are alkanediols having from 2 to 12 carbon atoms, preferably having 2, 4 or 6 carbon atoms, such as ethanediol, 1,3-propanediol, 1,5-pentanediol, 1,6-hexanediol, 1,7-heptanediol, 1,8-octanediol, 1,9-nonanediol, 1,10-decanediol and preferably 1,4-butanediol, dialkylene glycols having from 4 to 8 carbon atoms, such as diethylene glycol and dipropylene glycol, and difunctional to tetrafunctional polyoxyalkylene polyols having a molecular weight of up to 500. However, other suitable compounds include branched-chain and/or unsaturated alkanediols having usually not more than 12 carbon atoms, such as 1,2-propanediol, 2-methylpropane-1,3-diol, 2,2-dimethylpropane-1,3-diol, 2-butyl-2-ethylpropane-1,3-diol, but-2-ene-1,4-diol and but-2-yne-1,4-diol, diesters of terephthalic acid with glycols having from 2 to 4 carbon atoms, such as the bis(ethylene glycol) or bis(1,4-butanediol) ester of terephthalic acid, hydroxyalkylene ethers of hydroquinone or resorcinol, such as 1,4-di(β-hydroxyethyl)hydroquinone or 1,3-di(β-hydroxyethyl)resorcinol, alkanolamines having from 2 to 12 carbon atoms, such as ethanolamine, 2-aminopropanol and 3-amino-2,2-dimethylpropanol, N-alkyldialkanolamines such as N-methyldiethanolamine and N-ethyldiethanolamine.

Examples of higher-functional crosslinkers are trihydric and higher-functional alcohols such as glycerol, trimethylolpropane, pentaerythritol and trihydroxycyclohexanes, and also trialkanolamines such as triethanolamine.

Chain extenders which have been found to be very useful and are therefore preferably used are alkyl-substituted aromatic polyamines having molecular weights of preferably from 122 to 400, in particular primary aromatic diamines having in the ortho position relative to the amino groups at least one alkyl substituent which reduces the reactivity of the amino group by steric hindrance, which are liquid at room temperature and are at least partially, but preferably completely, miscible with the relatively high molecular weight, at least difunctional compounds (b) and N-perethoxylated polyoxyalkylene polyamines (c) under the processing conditions.

To prepare the microcellular PU elastomers, use is advantageously made of the industrially readily available 1,3,5-triethyl-2,4-phenylenediamine, 1-methyl-3,5-diethyl-2,4-phenylenediamine, mixtures of 1-methyl-3,5-diethyl-2,4- and 2,6-phenylenediamines, known as DETDA, isomer mixtures of 3,3'-dialkyl- or 3,3',5,5'-tetraalkyl-substituted 4,4'-diaminodiphenylmethanes having from 1 to 4 carbon atoms in the alkyl radical, in particular 3,3',5,5'-tetraalkyl-substituted 4,4'-diaminodiphenylmethanes containing bonded methyl, ethyl and isopropyl radicals, and also mixtures of said tetraalkyl-substituted 4,4'-diaminodiphenylmethanes and DETDA.

To achieve specific mechanical properties, it can also be advantageous to use the alkyl-substituted aromatic polyamines in admixture with the abovementioned low molecular weight polyhydric alcohols, preferably dihydric and/or trihydric alcohols or dialkyl glycols.

The low molecular weight chain extenders and/or crosslinkers are thus selected, in particular, from the group consisting of low molecular weight difunctional and/or trifunctional alcohols, difunctional to tetrafunctional polyoxyalkylene polyols having a molecular weight of up to 500 and alkyl-substituted aromatic diamines or mixtures of at least two of the chain extenders and/or crosslinkers mentioned.

d) According to the present invention, the blowing agent d) used is preferably water which reacts with isocyanate groups to form carbon dioxide.

The amounts of water which can be advantageously used are from 0.01 to 5% by weight, preferably from 0.3 to 3.0% by weight, based on the weight of the components (b) to (c).

However, it is also possible to use other blowing agents customary in the preparation of polyurethanes. Examples of suitable blowing agents are low-boiling liquids which vaporize under the action of the exothermic polyaddition reaction. Suitable liquids are those which are inert toward the organic polyisocyanate and have boiling points below 100° C. Examples of such preferred liquids are halogenated, preferably fluorinated, hydrocarbons such as methylene chloride and dichloromonofluoromethane, perfluorinated or partially fluorinated hydrocarbons such as trifluoromethane, difluoromethane, difluoroethane, tetrafluoroethane and heptafluoropropane, hydrocarbons such as n- and iso-butane, n- and iso-pentane and the industrial mixtures of these hydrocarbons, propane, propylene, hexane, heptane, cyclobutane, cyclopentane and cyclohexane, dialkyl ethers such as dimethyl ether, diethyl ether and furan, carboxylic esters such as methyl formate and ethyl formate, ketones such as acetone, and fluorinated and/or perfluorinated tertiary alkylamines such as perfluorodimethylisopropylamine. Mixtures of these low-boiling liquids with one another and/or with other substituted or unsubstituted hydrocarbons can also be used.

The most advantageous amount of low-boiling liquid for producing such cellular elastomer moldings from elastomers containing bonded urea groups depends on the desired density and on the amount of water concomitantly used. In general, amounts of from 1 to 15% by weight, preferably from 2 to 11% by weight, based on the weight of the components (b) and (c), give satisfactory results.

e) To accelerate the reaction, catalysts (e), either individually or in admixture with one another, are added to the reaction mixture. These are preferably organic metal compounds such as tin(II)salts of organic carboxylic acids, e.g. tin(II) dioctoate, tin(II) dilaurate, dibutyltin diacetate and dibutyltin dilaurate, and tertiary amines such as tetramethylethylenediamine, N-methylmorpholine, diethylbenzylamine, triethylamine, dimethylcyclohexylamine, diazabicyclooctane, N,N'-dimethylpiperazine, N-methyl-N'-(4,N-dimethylaminobutyl)piperazine, N,N,N',N",N"-pentamethyldiethylenediamine or the like.

Further suitable catalysts are:
amidines, such as 2,3-dimethyl-3,4,5,6-tetrahydropyrimidine, tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide and alkali metal alkoxides such as sodium methoxide and potassium isopropoxide, and also alkali metal salts of long-chain fatty acids having from 10 to 20 carbon atoms and possibly lateral OH groups.

Depending on the reactivity required, the activators are employed in amounts of from 0.001 to 0.5% by weight, based on the prepolymer.

f) In the preparation according to the present invention of the microcellular PU elastomer, use can be made of, in addition to the reaction-retarding substances mentioned above, further auxiliaries and additives f).

These include, for example, surface-active substances, hydrolysis inhibitors, antioxidants, cell regulators, flame retardants and dyes.

Suitable surface-active substances are compounds which aid the homogenization of the starting materials and may also be suitable for regulating the cell structure. Examples which may be mentioned are emulsifiers such as the sodium salts of castor oil sulfates or of fatty acids and also amine salts of fatty acids, e.g. diethylamine oleate, diethanolamine stearate, diethanolamine ricinoleate, salts of sulfonic acids e.g. alkali metal or ammonium salts of dodecylbenzene- or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, esters of castor oil or ricinoleic acid, Turkey red oil and peanut oil; and cell regulators such as paraffins, fatty alcohols and dimethylpolysiloxanes. The surface-active substances are usually employed in amounts of from 0.01 to 5 parts by weight, based on 100 parts by weight of the components (b) to (d).

For the purposes of the present invention, fillers are the customary organic and inorganic fillers known per se. Specific examples are: inorganic fillers such as siliceous minerals, for example sheet silicates such as antigorite, serpentine, hornblends, amphiboles, chrysotile, talc and zeolites, metal oxides such as kaolin, aluminum oxides, titanium oxides and iron oxides, metal salts such as chalk, barite and inorganic pigments such as cadmium sulfide and zinc sulfide. Preference is given to using kaolin (china clay), aluminum silicate and coprecipitates of barium sulfate and aluminum silicate and also natural and synthetic fibrous minerals such as wollastonite or glass fibers of various lengths, which may if desired be coated with a size. Examples of suitable organic fillers are: carbon black, melamine, rosin, cyclopentadienyl resins and graft polymers based on styreneacrylonitrile which can be prepared by in situ polymerization of acrylonitrile/styrene mixtures in polyoxyalkylene polyols as described in the German patents 11 11 394, 12 22 669, (U.S. Pat. Nos. 3,304,273, 3,383,351, 3,523,093), 11 52 536 (GB 1 040 452) and 11 52 537 (GB 987 618) and can then, if desired, be aminated, and also polyoxyalkylene polyol or polyoxyalkylene polyamine fillers in the case of which aqueous polymer dispersions are converted into polyoxyalkylene polyol or polyoxyalkylene polyamine dispersions. The inorganic and organic fillers can be used individually or as mixtures.

The inorganic and/or organic fillers can be incorporated into the reaction mixture in amounts of, for example, from 0.5 to 35% by weight, preferably from 3 to 20% by weight, based on the weight of the components (a) to (d).

Suitable flame retardants are, for example, tricresyl phosphate, tris-2-chloroethyl phosphate, tris(chloropropyl) phosphate and tris-2,3-dibromopropyl phosphate.

Apart from the halogen-substituted phosphates mentioned above, it is also possible to use inorganic flame retardants such as hydrated aluminum oxide, antimony trioxide, arsenic oxide, ammonium polyphosphate and calcium sulfate or melamine, expanded graphite or mixtures thereof, for example mixtures of melamine, expanded graphite and/or ammonium polyphosphate, for making the moldings flame resistant. In general, it has been found to be advantageous to use from 5 to 50 parts by weight, preferably from 5 to 25 parts by weight, of the flame retardants mentioned per 100 parts by weight of the components (b) to (d).

Further details regarding the abovementioned other customary auxiliaries may be found in the specialist literature, for example the monograph by J. H. Saunders and K. C. Frisch "High Polymers" Volume XVI, Polyurethanes, Parts 1 and 2, Interscience Publishers 1962 or 1964, or the Kunststoff-Handbuch, Polyurethane, Volume VII, Hanser-Verlag, Munich, Vienna, 1st and 2nd editions, 1966 and 1983.

The microcellular PU elastomers of the present invention are advantageously prepared by the one-shot process by means of the low-pressure technique or, in particular, the reaction injection molding (RIM) technique in open or preferably closed molds. In particular, the reaction is carried out with compaction in a closed mold. The reaction injection molding technique is described, for example, by H. Piechota and H. Röhr in "Integrál-schaumstoffe", Carl Hanser-Verlag, Munich, Vienna 1975; D. J. Prepelka and J. L. Wharton in Journal of Cellular Plastics, March/April 1975, pages 87 to 98 and U. Knipp in Journal of Cellular Plastics, March/April 1973, pages 76–84.

When using a mixing chamber having a plurality of feed nozzles, the starting components can be fed in individually and intensively mixed in the mixing chamber. It has been found to be advantageous to use the two-component process.

According to a particularly advantageous embodiment, a prepolymer containing NCO groups is first prepared. For this purpose, the oligomeric polyhydroxyl compounds b), if desired together with low molecular weight chain extenders and/or crosslinkers c), are reacted with the isocyanate component a) consisting essentially of 4,4'-MDI at from 80° C. to 160° C., preferably from 110° C. to 150° C. The reaction time is such that the theoretical NCO content is reached.

Blowing agents d) and catalysts e) and any further auxiliaries and/or additives f) used are usually combined in a crosslinker component.

The production of the microcellular moldings is advantageously carried out using only water as blowing agent and chain extender at an NCO/OH ratio of from 0.85 to 1.20 and also. catalysts e) in the presence of auxiliaries and/or additives f), with the NCO prepolymer heated to from 80 to 110° C. being intensively mixed with water, catalyst and auxiliaries and/or additives and placed, in an amount corresponding to the desired density of the molding, in a heated, tightly closing mold. The moldings are cured and therefore removable from the mold after from 10 to 40 minutes.

The amount of reaction mixture introduced into the mold is usually such that the moldings obtained have a density of from 250 to 1400 kg/m$^3$, with the compact moldings having a density of preferably from 1000 to 1400 kg/m$^3$ and in particular from 1000 to 1200 kg/M$^3$, and the microcellular moldings preferably having a density of from 300 to 1000 kg/m$^3$, in particular from 350 to 800 kg/m$^3$. On introduction into the mold, the starting components usually have a temperature of from 15 to 80° C., preferably from 30 to 65° C. The mold temperature is advantageously from 20 to 110° C., preferably from 35 to 95° C. The degrees of compaction for producing the microcellular or cellular moldings are from 1.1 to 8, preferably from 2 to 6.

Compared with the microcellular PU elastomers based on NDI, the internal mold pressure in the case of the PU elastomers of the present invention based on MDI is considerably increased (up to about 50%), so as to obtain the same foam density.

To improve the demolding of the elastomer moldings produced according to the present invention, it has been found to be advantageous to coat the inner surfaces of the mold with customary external mold release agents, for example those based on wax or silicone, or in particular with aqueous soap solutions, at least at the commencement of a production run. However, release agents which have been found to be particularly useful and are therefore preferably used are internal mold release agents as are described, for example, in EP-A-153 639, EP-A-15 180 749 (AU 85/47 498), EP-A-173 888 (U.S. Pat. No. 4,519,965), WO 84/03288 (EP-A-119 471) and WO 86/01215. The molding times are on average from 3 to 60 seconds, depending on the size and geometry of the molding.

The microcellular PU elastomers prepared according to the present invention have bulk densities of from 350 to 800 g/l and are preferably used as spring and damping elements in the motor vehicle sector and the industrial sector.

The following examples illustrate the invention.

EXAMPLE 1

Preparation of the prepolymer containing NCO groups 100 parts by weight (ppw) of a previously dewatered linear polyether-polyester polyol having a mean OH number of 56 mg KOH/g, namely a polycondensate of a short-chain polytetrahydrofuran having an average molecular weight of 250 g/mol and adipic acid, were reacted with 0.3 ppw of trimethylolpropane and 38 ppw of 4,4'-MDI at 115° C. while stirring continually. This gave a prepolymer having an NCO content of 5.68%.

a) Production of the molding (comparison)

To 100 ppw of this prepolymer which had previously been brought to a temperature of 90° C. were added, while stirring vigorously, 4.2 ppw of a crosslinker component having a water content of 26.7% by weight and comprising a mixture of Stabaxol 1, a sterically hindered carbodiimide known to those skilled in the art for hydrolysis inhibition, and ethoxylates of ricinoleic and oleic acid.

In addition, 0.05 ppw of Desmorapid PP (Rhein-Chemie GmbH) for catalyzing the blowing reaction and 0.2 ppw of silicone oil DC 193 (Air Products and Chemicals, Inc.) for improving the cell structure were added to the reaction mixture. After a total stirring time of 8 s, the reaction mixture was placed in a closable mold heated to 90° C. and was cured for 25 minutes. After removing the microcellular product from the mold, the molding was given 24 hours' intermediate storage in order to guarantee dimensional stability; this is necessary because of expansion effects. The material was then subjected to further thermal curing at 110° C. for 16 hours.

The microcellular PU elastomer produced in this way did not have the structures of the present invention, since melting above 230° C. no longer took place. Moreover, GPC signals in the range above 250,000 g/mol were not observed.

b) Production of the molding (according to the present invention)

100 ppw of the same prepolymer were reacted under identical process conditions with 4.2 ppw of the crosslinker mixture described in Example 1a) with addition of 0.07 ppw of a mixture of ethoxylated oleic acid having on average 9 ethoxy units and of the monoethanolamine salt of n-alkylbenzenesulfonic acid having alkyl radicals from $C_9H_{19}$ to $C_{15}H_{31}$. The blowing reaction here proceeded visibly more slowly. The further procedure was then similar to that of Example 1a).

For the products produced according to 1a) and 1b), melting graphs were recorded at a heating rate of 20° C./min using a DSC 7 from Perkin-Elmer. In addition, characteristic static properties were determined in accordance with DIN standards and gel permeation chromatograms were recorded. For this purpose, the heated samples were dissolved with good stirring in a mixture of N,N-dimethylformamide (DMF) containing 1% of di-n-butylamine at 90° C. The dissolution time was 2 hours, the concentration was 10%. These 10% strength solutions were chromatographed without dilution. Chromatography was carried out using DMF as mobile phase on a column set with Ultrastyragel 106 Å, 104 Å, 103 Å, 500 Å, 100 Å. In addition to the main peak at a retention time of 48.2 minutes, a peak appeared at 39.8 minutes. After addition of 0.1 M lithium chloride (0.1 mol of LiCl per 1 l of the total solution), the peak at 39.8 min disappeared completely.

Both the peak at 39.8 min which according to the table below corresponds to a molar mass far above 250,000 g/mol and the disappearance of this peak in the presence of LiCl, in our case 0.1 mol per liter, are characteristics of the structures of the present invention.

The calibration using defined polymethyl methacrylate (PMMA) samples is shown in the table below:

| Retention time in min | Molar mass in g/mol |
| --- | --- |
| 39.68 | 810,000 |
| 41.25 | 530,000 |
| 43.45 | 280,000 |
| 46.24 | 152,000 |
| 47.96 | 85,100 |
| 53.32 | 30,500 |
| 58.47 | 7100 |
| 59.81 | 3500 |

Plotting the logarithm of the molar mass against the retention time gave, in a known manner, a straight calibration line between the retention times 39.68 and 58.47 min. The chromatogram also displayed signals at molar masses greater than 810,000 g/mol which can likewise be designated as "greater than 250,000 g/mol" as per the present invention and disappear on addition of LiCl, thus indicating the structures of the present invention although they lie outside the calibration range. Detection was carried out by measurement of the index of refraction and/or of ultraviolet absorption at 265 nm. The detection method has no influence on the results in the context of this invention.

The compressive stress was measured by a modification of the method of DIN 53 572, at 80° C., 22 hours and 60% compression using spacers having a height of 18 mm and test specimens having a base area of 40×40 mm and a height of 30±1 mm.

The calculation is in accordance with the following equation $$CS(\%) = \frac{h_0 - h_2}{h_0 - h_1} \times 100 \%$$

$h_0$ = original height of the test specimen in mm $h_1$ = height of the test specimen in the deformed state in mm $h_2$ = height of the test specimen after release of the load in mm.

The microcellular PU elastomers produced as described in Examples 1 a and 1 b had a urea content of 16.3% by weight.

The urea content was calculated under the assumption of complete conversion of the polyurethane-forming reactants and complete evolution of $CO_2$ according to the following equation $$\% UR = \frac{m_{H_2O} + m_{MDI} - m_{CO_2}}{m_{PO} + mMDI + mCC + m_{H_2O} - m_{CO_2}} \times 100$$

$m_{PO}$ = amount of polyol used in the formulation $m_{MDI}$ = amount of 4, 4' -MDI available for the reaction with water $mMDI$ = amount of 4,4' -MDI used in the formulation $m_{co2}$ = amount of $CO_2$ formed in g at stoichiometric conversion $m_{H2O}$ = amount of water used $mCC$ = amount of chain extender/crosslinker used In Example 1 b, the structures of the present invention were present, as a result of which the compressive set dropped considerably in comparison with the microcellular elastomer of Example 1 a which had the same chemical composition but not the structures (see Table 1).

EXAMPLE 2 a (according to the present invention)

Preparation of the prepolymer

The preparation of the NCO-containing prepolymer from a linear polyether-polyester polyol was carried out in a similar way to Example 1. 100 ppw of this polyol were reacted with 0.3 ppw of trimethylolpropane and 33 ppw of 4,4'-MDI at 120° C. with continual stirring. The prepolymer formed had, after complete reaction, an NCO content of 4.78% by weight.

Production of the molding 100 ppw of the prepolymer were reacted at 90° C. with 2.64 ppw of a crosslinker mixture having a water content of 36.3% by weight and comprising Stabaxol 1, a mixture of ethoxylated oleic and ricinoleic acid, the monoethanolamine salt of n-alkylsulfonic acid and the sodium salt of sulfated castor oil with vigorous stirring and addition of 0.03 ppw of Desmorapid PP and 0.2 ppw of silicone oil DC 193 and poured into a mold heated to 90° C. After a molding time of 25 minutes and an intermediate storage time of 24 hours, the microcellular polyurethane was heated at 110° C. for 16 hours. The static mechanical parameters and a DSC melting graph and a gel permeation chromatogram were then recorded.

The product tested had a calculated urea content of 13.4% by weight. It thus displayed essential features of the invention, but a somewhat lower urea content compared with the recommended value of $\geq 14\%$ by weight.

EXAMPLE 2 b (according to the present invention)

Preparation of the prepolymer

The NCO prepolymer was prepared as described in Example 2 a except that 37 ppw of the isocyanate were used in place of 33 ppw of 4,4'-MDI. The completely reacted prepolymer had an NCO content of 5.65% by weight.

Production of the molding 100 ppw of the prepolymer which had been brought to a temperature of 90° C. were reacted with 3.1 ppw of the crosslinker mixture used in Example 2 a. Demolding and further treatment of the material were likewise carried out as described in Example 2 a.

The static mechanical parameters, the DSC melting behavior and a gel permeation chromatogram were measured on the microcellular polyurethane elastomer which had a calculated urea content of 15.7% by weight.

In comparison with Example 2 a, there was a distinct increase in the size of the GPC peak at greater than 250,000 g/mol relative to the main peak indicating the actual polymer chain at about 100,000 g/mol and thus there was an increase in the content of the structures of the present invention in the elastomer. This was also reflected in a somewhat higher DSC melting range and, as a result, a lower compressive set accompanied by improvement in other mechanical parameters

EXAMPLE 3 a (according to the present invention, heating after 30 minutes' intermediate storage)

Preparation of the NCO prepolymer 100 ppw of a dewatered linear polyether-polyester polyol having the composition corresponding to Example 1 were reacted with 0.3 ppw of trimethylolpropane and 38 ppw of 4,4'-MDI at 115° C. with intensive mixing. The NCO content of the finished prepolymer was measured as 5.65% by weight.

Production of the molding 100 ppw of the prepolymer were reacted at 90° C. with 3.1 ppw of a crosslinker whose composition corresponded to that of the crosslinker component of Example 2 a with addition of 0.03 ppw of Desmorapid PP and 0.2 ppw of silicone oil DC 193 and poured into a tightly closing mold heated to 90° C.

After a molding time of 30 minutes and intermediate storage for 30 minutes, the polyurethane molding was further cured at 110° C. for 16 hours.

The usual static parameters, a DSC melting curve and a gel permeation chromatogram were measured on the microcellular polyurethane elastomer thus obtained.

EXAMPLE 3 b (according to the present invention, heating after 24 hours' intermediate storage)

The preparation of the NCO prepolymer and the production of the molding, including its post-treatment and characterization, were carried out as described in Example 3 a, except that the intermediate storage time of the molding was 24 hours.

EXAMPLES 4 a AND b

Preparation of the NCO-containing prepolymer (according to the present invention)

a) 100 ppw of a polyesterol mixture comprising equal parts of polycondensates of an equimolar mixture of monoethylene glycol and 1,4-butanediol having average molecular weights of 2000 g/mol were reacted with 0.3 ppw of trimethylolpropane and 35 ppw of 4,4'-MDI, to which 15 ppm of diethylene glycol bis(chloroformate) had been added beforehand, at 115° C. with intensive stirring. After the reaction was complete, the NCO content was measured as 5.12% by weight.

b) The synthesis of the prepolymer was carried out using the same amounts of raw materials and identical process conditions as described under 4 a, except that the addition of the diethylene glycol bis(chloroformate) was omitted. The NCO content of the prepolymer was measured as 5.26% by weight.

For Examples 4 a and 4 b, the moldings were produced in the same way, with 100 ppw of the prepolymer being reacted at 90° C. with 2.82 ppw in the case of Example 4 a and with 2.90 ppw in the case of Example 4 b of the crosslinker mixture described under Example 2 a, with good homogenization of the mixture. The reaction mixture was subsequently poured into a mold heated to 90° C. After a molding time of 25 minutes, the mold was opened, the microcellular polyurethane molding was taken out and, after intermediate storage for 24 hours, was further cured for 16 hours at 110° C. The fully reacted material which had a calculated urea content of 14.6% by weight was tested in respect of its static mechanical parameters, it dynamic consolidation, the GPC behavior and its DSC melting characteristics.

EXAMPLE 4 c (Comparison)

The prepolymer was synthesized as in Example 4 b.

In contrast to Examples 4 a and 4 b, the moldings were produced using the crosslinker mixture described in Example 1 a, with 100 ppw of the prepolymer being reacted at 90° C. with 3.94 ppw of crosslinker mixture, with good homogenization of the reaction mixture, and poured into a mold heated to 90° C. The elastomer molding taken from the mold after a molding time of 25 minutes was further treated and tested as described under 4 b.

EXAMPLE 5

(Comparison)

Preparation of the NCO prepolymer 100 ppw of a dewatered linear polyether-polyester polyol having the composition corresponding to Example 1 were reacted with 24 ppw of Desmodur 15 (naphthylene diisocyanate) at 140° C. with intensive homogenization of the reaction mixture. The Desmodur 15 was added as a solid. The NCO content of the fully reacted prepolymer was 3.92% by weight.

Production of the molding 100 ppw of the prepolymer heated to 90° C. were reacted with 2.9 ppw of the crosslinker mixture described in Example 1 a with addition of 0.03 ppw of Desmorapid and 0.2 ppw of silicone oil DC 193. The reaction mixture was then, as in the previous examples, poured into a mold heated to 90° C. After a molding time of 25 minutes, the molding was given 24 hours' intermediate storage, heated at 120° C. for 16 hours and tested in respect of its mechanical parameters.

EXAMPLES 6 a TO c (machine test)

Preparation of the NCO prepolymer 14 000 ppw of a previously dewatered polyester polyol mixture containing ether groups and comprising 12 838 ppw of a polycondensate of a short-chain polytetrahydrofuran having an average molecular weight of 250 g/mol and adipic acid and 1162 ppw of a polycondensate of the same short-chain polytetrahydrofuran, trimethylolpropane and adipic acid, with the mixing ratio of the polyols being selected in such a way that the trimethylolpropane content was 3 g/1000 g of the total polyol mixture, were reacted with 5320 ppw of 4,4'-MDI at 115° C. with intensive stirring. The NCO content of the prepolymer was measured as 5.97% by weight.

a) Foaming was carried out using a low-pressure foaming machine at a mixer rotation rate of 2700 rpm and a total output of 18.9 g/s. The mixing ratio of prepolymer to crosslinker component was 100:4.25.

The crosslinker mixture, which had a water content of 28.1%, comprised Stabaxol 1, a mixture of ethoxylated oleic and ricinoleic acids, the monoethanolamine salt of n-alkylsulfonic acid having $C_9$–$C_{15}$-alkyl radicals and the sodium salt of sulfated castor oil. 0.03 ppw of Desmorapid PP and 0.2 ppw of silicone oil DC 193, based on the prepolymer component, were added to the crosslinker mixture. The reaction mixture was placed in tightly closing test spring and block molds heated to 90° C., and these were opened after 30 minutes. After an intermediate storage time of at most 30 minutes, the moldings were heated for 16 hours at 110° C.

b) Prepolymer preparation, formulation and technical process conditions for production of moldings corresponded completely to the procedures of Example 6 a except for the way in which the thermal post-treatment was carried out.

The only change made was in the intermediate storage time between demolding and heating, which was increased to 24 hours.

c) Formulation and preparation of the prepolymer and also the method by which the thermal post-treatment was carried out corresponded to Example 6 a. However, the composition of the crosslinker mixture was modified from that given in Example 6 a, viz. 0.02 ppw of 4,4'-MDI, based on 100 ppw of the prepolymer, were added to the crosslinker mixture with vigorous stirring. This gave, within 30 seconds, a finely divided urea-crosslinker dispersion which was stable on storage for at least 4 hours. The urea content calculated for complete conversion of the isocyanate groups and for a stoichiometric reaction was about 0.017 ppw per 4.25 ppw of crosslinker component. The further procedure for production of moldings including post-treatment was as described in Example 6 a.

For the microcellular PU elastomers obtained as described in Examples 6 a to 6 c, which had a urea content of 16.3% by weight, the DSC melting curves, gel permeation chromatograms and the usual static parameters were recorded and in addition constant-energy dynamic tests on a test spring were carried out by means of a hydropulser. The test spring had a cylindrical shape with a height of 100 mm, an external diameter of 50 mm and an internal diameter of 10 mm and possessed three segment constrictions. After subjecting the test spring to 100,000 loading cycles at a load of 6 kN and a frequency of 1.2 Hz, the consolidation was measured as the difference between the final and the initial heights of the spring and was a measure of the compressive deformation during the cyclic fatigue test. The greater the rebound measured, the lower was the consolidation and the better the dynamic performance of the material. The test under force-regulated conditions thus allowed a realistic prediction of material suitability for shock-damping systems in motor vehicle construction.

EXAMPLE 7

Machine test (Comparison)

Preparation of the prepolymer 14,000 ppw of the previously dewatered polyol mixture having a composition as in Example 6 a were reacted with 4900 ppw of 4,4'-MDI at 115° C. with intensive mixing. The NCO content of the completely reacted prepolymer was measured as 5.39% by weight.

Production of the molding

Foaming was carried out by a method similar to Example 6 a using a low-pressure machine at a mixer rotation rate of 2700 rpm and an output of 18.9 g/s.

The mixing ratio of prepolymer and crosslinker component was adjusted to 100:4.28. The composition of the crosslinker mixture was the same as in Example 1 a. 0.03 ppw of Desmorapid PP and 0.2 ppw of silicone oil DC 193, based on the prepolymer component, were added to the crosslinker mixture prior to foaming. The reaction mixture was introduced into test spring and block molds heated to 90° C., and the molds were immediately closed tightly. After a molding time of 25 minutes, the molds were opened, the microcellular moldings were given 24 hours' intermediate storage and were subsequently subjected to further curing for 16 hours at 110° C.

Apart from the testing of the static parameters of DSC and GPC analysis, the dynamic consolidation of the test springs was determined under constant-energy conditions.

The parameters determined in Examples 1 to 7 are summarized in Tables 1 and 2.

TABLE I

| | Examples (Laboratory manual casting) | | | | | | | | | |
|---|---|---|---|---|---|---|---|---|---|---|
| physical property | 1a (Comparison) | 1b | 2a | 2b | 3a | 3b | 4a | 4b | 4c (Comparison) | 5 (Comparison) |
| Density (g/cm³) | 0.5 | 0.51 | 0.5 | 0.5 | 0.52 | 0.52 | 0.53 | 0.51 | 0.53 | 0.49 |
| Tensile strength (N/mm²) DIN 53 571 | 3.6 | 3.8 | 3.4 | 4 | 4 | 4.2 | 5.4 | 4.7 | 4.9 | 3.4 |
| Elongation at break (%) DIN 53 571 | 540 | 500 | 470 | 480 | 405 | 450 | 513 | 513 | 578 | 340 |
| Tear propagation resistance (N/mm) DIN 53 515 | 16.5 | 17 | 13.7 | 17.3 | 17 | 21.1 | 22.5 | 20.6 | 20 | 13.5 |
| Compressive set 22 h, 80° C. (%) | 70 | 49 | 29 | 25 | 26 | 31 | 18 | 23 | 33 | 19 |
| Urea content (Gew.-%) | 16.3 | 16.3 | 13.4 | 15.7 | 16.3 | 16.3 | 14.6 | 14.6 | 14.6 | 9.7 |
| DSC melting range (°C.) 20° C./min heating rate | 132–220 | 148–233 | 135–236 | 138–242 | 149–250 | 139–247 | 139–244 | 150–248 | 18–238 | — |
| GPC signal having an apparant molar mass >250,000 g/mol | not present | present | present | present | present | present | present | present | not present | present |
| GPC signal disappears on adding 0.1 m LiCl | — | yes | yes | yes | yes | yes | yes | yes | — | yes |

TABLE 2

Examples (Machine tests)

| physical property | 6a | 6b | 6c | 7 (Comparison) |
|---|---|---|---|---|
| Density (g/cm$^3$) | 0.49 | 0.5 | 0.49 | 0.5 |
| Tensile strength (N/mm$^2$) DIN 53 571 | 4.2 | 4.7 | 4.4 | 3.8 |
| Elongation at break (%) DIN 53571 | 480 | 520 | 470 | 550 |
| Tear propagation resistance DIN 53 515 (N/mm) | 13.8 | 15 | 13.5 | 14.4 |
| Compressive set 22 h, 80° C., (%) | 15 | 26 | 13 | 29 |
| dynamic consolidation (%) 100,000 load cycles at 1,2 Hz, Load 6 kN | 12.2 | 17.8 | 11.8 | >20 |
| DSC melting Heating rate 20° C./min | 143–242 | 149–242 | 146–245 | 113–209 |
| GPC Signal having an apparent molar mass >250,000 g/mol | present | present | present | not present |
| GPC Signal disappears with 0.1 m LiCl | yes | yes | yes | — |

What is claimed is:

1. A microcellular polyurethane elastomer containing urea groups, comprising the reaction product of
   a) an isocyanate component consisting essentially of diphenylmethane 4,4'-diisocyanate with
   b) at least one oligomeric polyhydroxyl compound having a number average molar mass of from 1000 to 5000 g/mol and a functionality of from 1.7 to 3, and, optionally,
   c) low molecular weight chain extenders and/or crosslinkers in the presence of
   d) a blowing agent
   and, optionally,
   e) a catalyst, and
   f) auxiliaries and/or additives, said elastomer having a urea content of from 14 to 18% by weight, defined as the amount in percent of urea of the empirical formula $C_{14}H_{12}ON_2$ formed from diphenylmethane diisocyanate, based on the total amount of the elastomer after urea formation, and having, after heating at from 100 to 120° C. for from 8 to 24 hours, a melting range of from 130° C. as the minimum lower limit to 230° C. as the minimum upper limit, measured by differential scanning calorimetry (DSC) at a heating rate of 20° C./min, which melting range can be set by adding Brönstedt or Lewis acid reagents in an amount of from 0.01 to 5% by weight, based on the weight of the components a), b), e) and, if used, c).

2. A microcellular polyurethane elastomer as claimed in claim 1 having a physicochemical structure which, in the gel permeation chromatogram (GPC) of a solution of the microcellular polyurethane elastomer prepared at 90° C. in N,N-dimethylformamide containing 1% of di-n-butylamine measured against polymethyl methacrylate (PMMA) as standard, displays a signal occurring in addition to the low molecular weight main signal and comprising one or more peaks at an apparent molar mass of greater than 250,000 g/mol which becomes smaller or disappears on addition of lithium chloride to this solution.

3. A process for preparing a microcellular polyurethane elastomer containing urea groups comprising reacting
   a) an isocyanate component comprising diphenylmethane 4,4'-diisocyanate with
   b) at least one oligomeric polyhydroxyl compound having a number-average molar mass of from 1000 to 5000 g/mol and a functionality of from 1.7 to 3, and
   c) optionally, low molecular weight chain extenders and/or crosslinkers in the presence of
   d) a blowing agents and, optionally
   e) catalysts and
   f) auxiliaries and/or additives in a closed mold, wherein Brönstedt acid or Lewis acid reagents are added in an amount of from 0.01 to 5% by weight, based on the weight of the components a), b), e) and, if used, c), and the microcellular polyurethane elastomer containing urea groups is heated at from 100 to 120° C. for from 8 to 24 hours.

4. A process for preparing a microcellular polyurethane elastomer as claimed in claim 3, wherein the Brönstedt acid or Lewis acid reagents are used in amounts of from 0.05 to 2% by weight, based on the weight of components a), b), e) and, if used, c).

5. A process for preparing a microcellular polyurethane elastomer as claimed in claim 3, wherein a salt of monoethanolamine and n-alkylbnzenesulfonic acid having alkyl radicals of from $C_9H_{19}$ to $C_{15}H_{31}$ are used.

6. A process for preparing a microcellular polyurethane elastomer as claimed in claim 3, wherein the heating of the moldings for from 8 to 24 hours at from 100 to 120° C. begins after removal from the mold, during storage at room temperature, within a period of 2 hours.

7. A process for preparing a microcellular polyurethane elastomer as claimed in claim 3, wherein components a), d), e) and f), if used, contain from 0.05 to 5% by weight of urea groups.

8. A process for preparing a microcellular polyurethane elastomer as claimed in claim 3, the oligomeric polyhydroxyl compounds having a number average molar mass of from 1000 to 5000 g/mol of component b) have a functionality of 2.

9. A microcellular polyurethane elastomer containing urea groups made according to the process as claimed in claim 3.

10. A process as claimed in claim 3, wherein the heating of the moldings for from 8 to 24 hours at from 100 to 120° C. begins after removal from the mold, during storage at room temperature, within a period of 2 hours.

11. A process as claimed in claim 3, wherein the components a), d), e) and, if used, f) contain from 0.05 to 5% by weight of urea groups.

12. A process as claimed in claim 3, wherein the oligomeric polyhydroxyl compounds having a number average molar mass of from 1000 to 5000 g/mol of component b) have a functionality of 2.

13. A process as claimed in claim 4, wherein the heating of the moldings for from 8 to 24 hours at from 100 to 120° C. begins after removal from the mold, during storage at room temperature, within a period of 2 hours.

14. A process as claimed in claim 5, wherein the heating of the moldings for from 8 to 24 hours at from 100 to 120° C. begins after removal from the mold, during storage at room temperature, within a period of 2 hours.

15. A process as claimed in claim 4, wherein the components a), d), e) and, if used, f) contain from 0.05 to 5% by weight of urea groups.

16. A process as claimed in claim 5, wherein the components a), d), e) and, if used, f) contain from 0.05 to 5% by weight of urea groups.

17. A process as claimed in claim 6, wherein the components a), d), e) and, if used, f) contain from 0.05 to 5% by weight of urea groups.

18. A process as claimed in claim 4, wherein the oligomeric polyhydroxyl compounds having a number average molar mass of from 1000 to 5000 g/mol of component b) have a functionality of 2.

19. A process as claimed in claim 5, wherein the oligomeric polyhydroxyl compounds having a number average molar mass of from 1000 to 5000 g/mol of component b) have a functionality of 2.

20. A process as claimed in claim 6, wherein the oligomeric polyhydroxyl compounds having a number average molar mass of from 1000 to 5000 g/mol of component b) have a functionality of 2.

21. A process as claimed in claim 7, wherein the oligomeric polyhydroxyl compounds having a number average molar mass of from 1000 to 5000 g/mol of component b) have a functionality of 2.

\* \* \* \* \*